United States Patent [19]

Greding

[11] Patent Number: 4,472,155

[45] Date of Patent: Sep. 18, 1984

[54] DIVIDED ROLL MOUNTING

[75] Inventor: Robert Greding, Beaconsfield, Canada

[73] Assignee: Valmet-Dominion Inc., Lachine, Canada

[21] Appl. No.: 493,341

[22] Filed: May 10, 1983

[51] Int. Cl.³ .................. F16D 3/64; F16C 1/02; B65H 17/08

[52] U.S. Cl. ..................... 464/73; 464/76; 242/66; 308/DIG. 2

[58] Field of Search .................. 464/69, 81–85, 464/89, 73, 74, 76, 149; 242/66; 308/DIG. 2

[56] References Cited

U.S. PATENT DOCUMENTS

| | | | |
|---|---|---|---|
| 1,548,629 | 8/1925 | Pfander | 464/76 |
| 1,868,150 | 7/1932 | Potter | 308/DIG. 2 |
| 2,003,848 | 6/1935 | Grundy | 464/73 |
| 2,389,581 | 11/1945 | Tarr | 308/DIG. 2 |
| 3,668,892 | 6/1972 | Alsch | 464/73 |
| 3,990,648 | 11/1976 | Justus | 242/66 |
| 4,095,755 | 6/1978 | Snygg et al. | 242/66 |

OTHER PUBLICATIONS

Photo copy of a blueprint used to construct bearings and support, 1965.

Primary Examiner—Stuart S. Levy
Assistant Examiner—Thomas R. Hannon
Attorney, Agent, or Firm—Raymond A. Eckersley

[57] ABSTRACT

A rider roll structure is provided by a beam with at least a pair of rider rolls mounted thereon with adjacent ends of the rolls being mounted in a bearing assembly wherein shafts extending from each adjacent end of each roll are provided at their axial ends with a land and groove configuration so that the lands formed on one shaft are received in the grooves formed on the other and a resilient member is received within the grooves and is shaped so that it extends between mating land areas so that drive from one roll to the other is through the resilient member and the resilient member can accommodate slight angles between the axes of rotation of the rolls. A sleeve surrounds the shaft and the resilient member is keyed to this sleeve which in turn is mounted in a bearing that is mounted on the rider roll beam.

3 Claims, 4 Drawing Figures

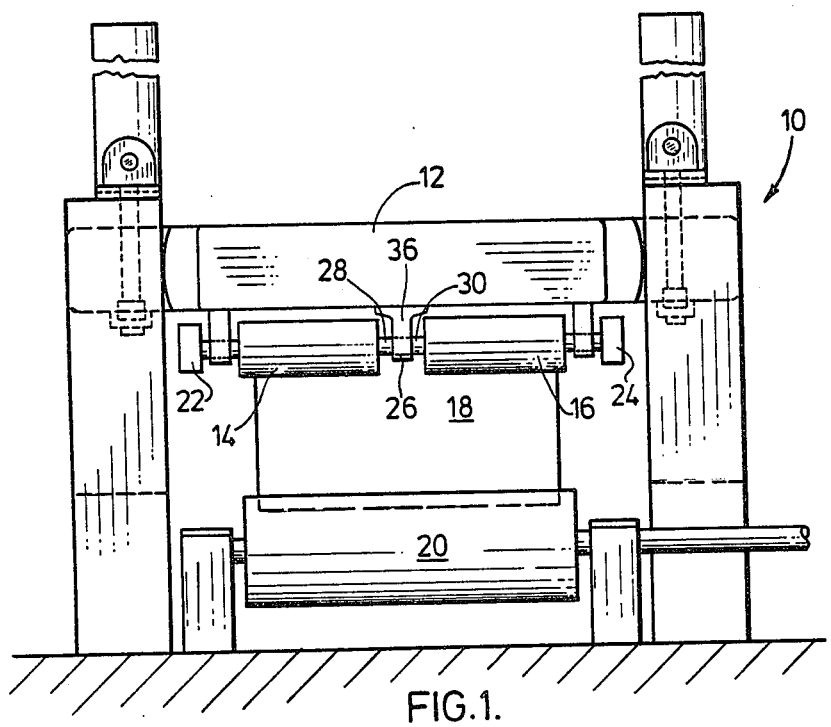
FIG.1.
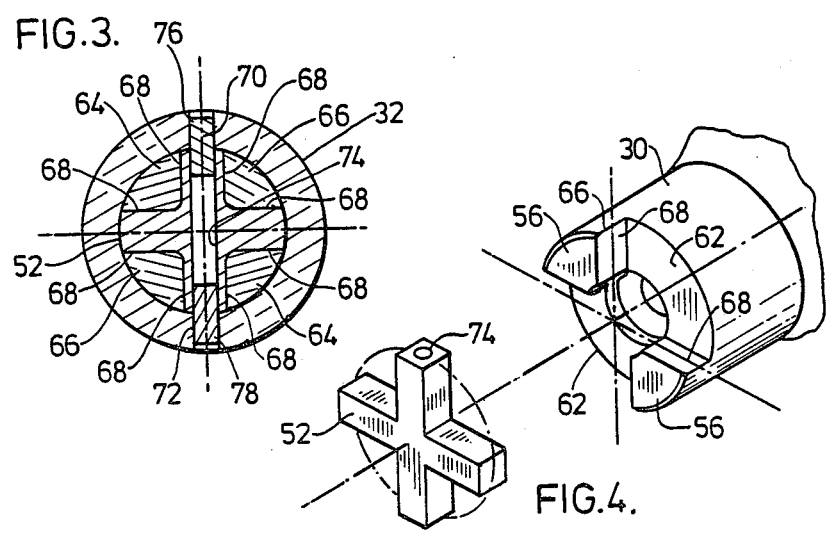
FIG.3.
FIG.4.

DIVIDED ROLL MOUNTING

FIELD OF THE INVENTION

The present invention relates to a divided roll mounting assembly. More particularly, the present invention relates to a rider roll coupling for connecting and mounting adjacent ends of a pair of rider rolls mounted on a rider roll beam.

BACKGROUND OF THE INVENTION

In winding or rewinding of rolls of web material such as paper rolls on two drum winders it is common practice to apply a weight adjacent the top of the roll as it is being wound by means of rollers mounted on a rider roll beam which bear on the roll of web like material being wound. Generally such rolls are mounted in suitable bearings and are coupled together to rotate at the same speed. Generally such rolls are not driven directly by the roll being wound but are driven individually by means of separate motors or the like and are coupled together by some form of flexible coupling to ensure the rolls rotate at the same speed in the event their respective individual motors have different torques.

The beam carrying these rolls may be subject to a slight deflection and the coupling between adjacent rolls must also be able to accommodate slight angular deflections between the axes of rotation of adjacent rolls.

One common way of mounting and coupling adjacent ends of a pair of rider rolls mounted on a beam is to insert stub shafts extending from the adjacent ends of the rolls into a sleeve and to clamp the sleeve to each of the stub shafts, the sleeve preventing relative rotation of the rolls but accommodating slight angular deflection of its axis of one roll relative to an adjacent roll. The sleeve in turn is mounted in suitable bearing means supported from the beam itself.

In another variation of this technique instead of the sleeve being clamped to each of the stub shafts it may be pinned or otherwise secured thereto.

It is also known to pin the sleeve to one of the stub shafts and couple adjacent ends of the stub shafts together by means of pins projecting axially from one of the stub shafts into the end of the adjacent stub shaft.

BRIEF DESCRIPTION OF THE PRESENT INVENTION

It is an object of the present invention to provide a new rider roll mounting and coupling that is more effective and less expensive than many of those heretofore employed while allowing the adjacent roll ends to lie in close proximity to each other.

Broadly, the present invention relates to a rider roll beam provided with at least two rider rolls mounted in substantially axially aligned relationship on the beam via a means for mounting which includes a mounting for adjacent ends of each pair of such rolls comprising shafts extending from each of said rolls and mating land and groove areas formed on the adjacent axial ends of these roll shafts with a resilient member received in said grooves and shaped to be interposed between said land areas on the adjacent shafts in a manner such that drive from one roll to the other is transmitted through compression of said resilient member, the resilient member being positioned and adapted to be compressed to absorb relative angular displacement of the axis of adjacent rolls due to deflection of said beam, a sleeve surrounding the shafts and said resilient member, said resilient member being keyed to the sleeve, the sleeve in turn being mounted in a bearing which is fixed to the beam thereby mounting the adjacent ends of the roll for rotation on the beam.

BRIEF DESCRIPTION OF THE DRAWINGS

Further features, objects and advantages will be evident from the following detailed description of the preferred embodiments of the present invention taken in conjunction with the accompanying drawings in which:

FIG. 1 is a schematic representation of an end view of a winder with a rider roll beam.

FIG. 3 is a section along the line 3—3 of FIG. 2; and

FIG. 4 is an exploded view of the resilient insert and one of the pair of mating shaft ends on one of a pair of adjacent rolls.

DESCRIPTION OF THE PREFERRED EMBODIMENT

Figure 2:
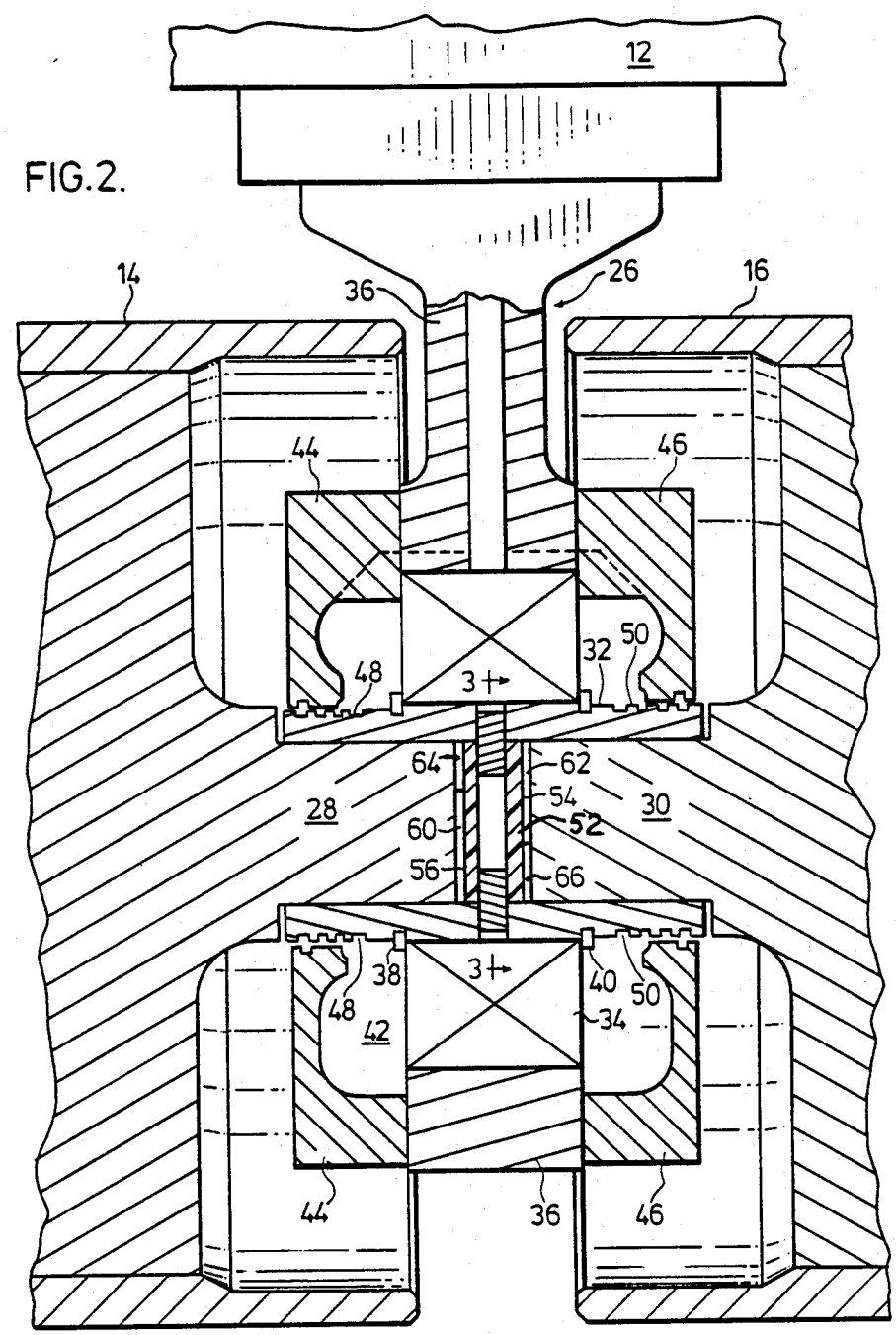
FIG. 2 is an axial section through the mounting of the adjacent ends of a pair of rolls on the beam.

A winder generally indicated at 10 in FIG. 1 incorporates a rider roll beam 12 having rider rolls 14 and 16 mounted thereon and adapted to rest against the upper surface of a roll 18 of paper being wound. The paper, as it is being wound, is supported on suitable support rolls 20 (only one shown) which are driven to rotate the roll 18 and wind the web thereon.

The present invention is particularly concerned with the manner in which the rider rolls such as those indicated at 14 and 16 are mounted on suitable bearings on the beam 12 so they may rotate in contact with the paper roll 18.

As above indicated the rolls 14 and 16 are individually driven via suitable motor drives such as those schematically indicated at 22 and 24 at the outside ends of the rolls 14 and 16, respectively.

In many cases the actual drive to the rolls 14 and 16 would be from motors mounted on the beam 12 with some form of coupling connecting the drive shaft of one motor with roll 14 and another coupler connecting another motor with roll 16.

The specific mounting and coupling mechanism 26 forming the preferred embodiment of the present invention is shown in vertical section in FIG. 2. This mounting and coupling mechanism 26 is interposed between the two rolls 14 and 16 and embraces stub shafts 28 and 30 extending axially from the rolls 14 and 16, respectively (see FIGS. 1 and 2). Spacing between the ends of the rolls 14 and 16 has been greatly exaggerated in FIG. 1 and would in practice follow what is illustrated in FIG. 2.

As shown in FIG. 2 two stub shafts 28 and 30 extending from the rolls 14 and 16 respectively, are received within a right cylindrical sleeve 32 which in turn is mounted in bearing 34 supported by pedestal 36 extending downwardly from the beam 12. The bearing 34 is keyed in position on the sleeve 32 via suitable C clips such as those indicated at 38 and 40.

In the illustrated arrangement a suitable oil retaining chamber 42 is formed about the bearing 34 via a pair of housing members 44 and 46 positioned one on each side of the pedestal 36 in surrounding relation to the bearing 34 and positioned in close proximity to the outer surface of the sleeve 32 spaced from their respective sides of the bearing 34.

The sleeve 32 is provided at its opposite axial ends on its outer surface with a helical groove 48 and 50 spiralled in such a manner as to tend to pump the oil inward toward the bearing 34 as the sleeve rotates and channel the oil back into the cavity or space 42 surrounding the bearing 34.

The specific coupling between the two stub shafts 28 and 30 is most clearly shown in FIGS. 2, 3 and 4. In the particular arrangement shown a resilient cruciform member 52 is received within grooves or voids 60 and 62 formed in the end faces 54 and 56 of the stub shafts 28 and 30. These voids are indicated at 60 and 62 in FIG. 2 there being two equivalent voids in each of the end faces which leave axially extending bosses or land areas 64 and 66 extending from each of the stub shafts 28 and 30, respectively. These bosses 64 and 66 are substantially pie shaped in cross section as shown in FIG. 3 and are provided with substantially radial faces 68.

The cruciform member 52 is interposed between a pair of adjacent faces 68 on adjacent bosses 64 and 66 respectively, of the stub shafts 28 and 30. The cruciform member 52 is keyed in position by suitable key members 70 and 72 which are received within an axial passage 74 in one arm of the cruciform member. These pins or keys 70 and 72 project radially outward from the cruciformed member 52 and are received within suitable apertures 76 and 78 formed in the sleeve 32. Thus the resilient cruciform member 52 transmit torsional forces between the shafts 28 and 30 by pressure between the faces 68 of the projection 64 and 66 engaging the arms of the cruciformed member 52.

It will be apparent that the rider rolls 14 and 16 are coupling together with the resilient member 52 so that they rotate at the same speed and any angular deflection of the axis of one roll to the axis of the adjacent roll is accommodated by reshaping of the member 52 between the land areas 64 and 66.

The axial length of the bosses or projections 64 and 66 is greater that the thickness of the member 52 and the boss does not in normal operating conditions extend to the bottom of the voids or spaces 60 and 62 so there is a clearance provided between the axial ends of the projections 64 and 66, and the bottom of the spaces 60 and 62 to accommodate axial expansion of the rolls as their temperature increases in operation.

While a cruciformed or X-shaped member has been shown as forming the preferred embodiment of the present invention, it is not essential that the resilient member take this particular shape. It is only essential that there be abuttments projecting axially from each of the two shafts and that there be a resilient member interposed between the abuttments on adjacent shafts so that this resilient member may ensure the two rolls rotate at the same speed and may be deformed to permit changes in the angular relationship of the axes of adjacent rolls. The cruciform member is the most convenient means for doing this and permits keying of the member directly to the sleeve 32. In the illustrated arrangement two key pins 70 and 72 are shown, however, four may be used if desired or only one. The sleeve 32 and member 52 are keyed together to prevent significant axial or radial movement between these two elements and thereby insure that the sleeve rotates with the shafts 28 and 30.

The resilient member may be made of any suitable material and will have a greater degree of resilience than the shafts themselves. Preferably it will be made of materials such as rubber compounds, nylon or high molecular weight polyethylene or the like.

The invention has been described in relation to the preferred application as a rider roll mounting. It may also find application in mounting for example spreader or draw rolls.

Having described the invention modifications will be evident to those skilled in the art without departing from the spirit of the invention as defined in the appended claims.

What I claim as new and desire to secure by Letters Patent of the United States is:

1. A mounting for a pair of adjacent ends of a pair of adjacent substantially axially aligned rolls comprising:
   shafts extending from each of said rolls mating projections and voids formed on the adjacent axial ends of said shafts;
   a resilient member received in said voids and interposed between each of said projection extending from the adjacent said shafts in a manner such that drive from one roll to the other is transmitted through said resilient member;
   said resilient member is in position to and is adapted to be deformed on changes in angular relationship between the axes of rotation of said rolls;
   a sleeve surrounding said shafts and said resilient member;
   means for keying said resilient member to said sleeve;
   bearing means surrounding and mounting said sleeve to permit rotation of said rolls.

2. A mounting as defined in claim 1 wherein said rolls are rider rolls for a web winder and wherein said bearing is mounted on a pillar connected to a rider roll beam.

3. A mounting as defined in claim 2 wherein said resilient member is a cruciform shape and there are pairs of diametrically opposed land areas extending from each said shaft.

* * * * *